United States Patent [19]
Swinehart

[11] Patent Number: 5,717,955
[45] Date of Patent: Feb. 10, 1998

[54] SYSTEM FOR CHANGING DEVICE FROM SPECIALIZED INTERFACE THAT ENABLES CONTROL OF SUBSYSTEM TO GENERAL INTERFACE THAT PERFORMS GENERAL PURPOSE COMPUTING FUNCTIONS UNRELATED TO THE SUBSYSTEM

[75] Inventor: Daniel C. Swinehart, Palo Alto, Calif.

[73] Assignee: Xerox Corporation, Stamford, Conn.

[21] Appl. No.: 372,476

[22] Filed: Jan. 13, 1995

Related U.S. Application Data

[63] Continuation-in-part of Ser. No. 161,968, Dec. 3, 1993, Pat. No. 5,555,376.

[51] Int. Cl.$^6$ ..................... G06F 15/40
[52] U.S. Cl. ..................... 395/882
[58] Field of Search ..................... 395/800, 500, 395/835, 821, 836, 882, 883, 828, 837, 838, 839, 856

[56] References Cited

U.S. PATENT DOCUMENTS

| | | | |
|---|---|---|---|
| 4,217,588 | 8/1980 | Freeny, Jr. | 342/458 |
| 4,303,904 | 12/1981 | Chasek | 340/825.54 |
| 4,952,928 | 8/1990 | Carroll et al. | 340/825.54 |
| 5,027,314 | 6/1991 | Linwood et al. | 364/460 |
| 5,068,916 | 11/1991 | Harrison et al. | 455/39 |
| 5,099,346 | 3/1992 | Lee et al. | 359/118 |
| 5,111,423 | 5/1992 | Kopec, Jr. et al. | 395/500 |
| 5,119,104 | 6/1992 | Heller | 342/450 |
| 5,122,959 | 6/1992 | Nathanson et al. | 364/436 |
| 5,159,592 | 10/1992 | Perkins | 370/338 |
| 5,181,200 | 1/1993 | Harrison | 370/468 |
| 5,274,770 | 12/1993 | Khim Yeoh et al. | 395/800 |
| 5,379,382 | 1/1995 | Woh et al. | 395/500 |
| 5,497,241 | 3/1996 | Ostrover et al. | 386/97 |
| 5,537,605 | 7/1996 | Teece | 395/800 |

FOREIGN PATENT DOCUMENTS 2230365A 10/1990 United Kingdom.

OTHER PUBLICATIONS

Weiser, M. Some Computer Science Issues in Ubiquitous Computing. Communications of the ACM. Jul. 1993, vol. 36, No. 7. pp. 84.

Kleiner, A. The Ultimate Control Chip the Programable World. Popular Science. May 1992. pp. 90–95.

Schilit, B. N.;Adams, N.; Gold, R.; Tso, M.M.; Want, R. The Parctab Mobile Computing System. PARC Papers at WWOS-IV, 1993 IEEE and Xerox. pp. 1–6.

"Home Process Control", by Lewart, C.R. PC Magazine, V3, N25, pp. 215–218, Dec. 25, 1984.

"General Purpose Controller for Computer Controlled Application", by Davis, W.G., IBM Corp. 1971.

*Primary Examiner*—Thomas C. Lee
*Assistant Examiner*—Moustafa Mohamed Meky
*Attorney, Agent, or Firm*—R. Christine Jacobs; Tracy L. Hurt

[57] ABSTRACT

The present invention describes a method for superimposing general usage interface characteristics upon a computing device configured with specialized interface characteristics to enable the particular computing device to control general purpose computing functions. The user may also establish control of a portion of the display of a particular computing device. The computing system may include multiple computing devices, users, and subsystems that may be controlled by control devices. A first event signals a request for a change of the particular computing device from specialized interface characteristics to general interface characteristics unrelated to the specialized interface, and the particular computing device is reconfigured to general interface characteristics. Control of the device may also be based on the context of the system and the environment of the particular device.

14 Claims, 8 Drawing Sheets

SYSTEM FOR CHANGING DEVICE FROM SPECIALIZED INTERFACE THAT ENABLES CONTROL OF SUBSYSTEM TO GENERAL INTERFACE THAT PERFORMS GENERAL PURPOSE COMPUTING FUNCTIONS UNRELATED TO THE SUBSYSTEM

CROSS REFERENCE TO OTHER APPLICATIONS

The present application is a continuation-in-part of copending, commonly assigned U.S. patent application Ser. No. 08/161,968, "METHOD FOR GRANTING A USER REQUEST HAVING LOCATIONAL AND CONTEXTUAL ATTRIBUTES CONSISTENT WITH USER POLICIES FOR DEVICES HAVING LOCATIONAL ATTRIBUTES CONSISTENT WITH THE USER", now U.S. Pat. No. 5,555,376, filed Dec. 3, 1993 which is hereby incorporated herein by reference. The subject matter of the present invention is also related to the subject matter of concurrently filed, commonly assigned U.S. patent application Ser. No. 08/162,522, still pending "SPECIFYING AND ESTABLISHING COMMUNICATION DATA PATHS BETWEEN PARTICULAR MEDIA DEVICES IN MULTIPLE MEDIA DEVICE COMPUTING SYSTEMS BASED ON CONTEXT OF A USER OR USERS."

FIELD OF THE INVENTION

The present invention relates to techniques for using dedicated computing devices, such as resource controllers and information displays, as general purpose computing devices, and vice versa. The invention further relates to techniques for temporarily transferring control, including exclusive control, of computing devices dedicated to a specialized use to individual users at the user's request.

BACKGROUND OF THE INVENTION

The introduction of computer networks and personal computing has forever changed users' expectations of what computer systems can accomplish. Individual users no longer expect to travel to a particular location to have their processing needs met. Instead, individuals expect to have sufficient computing power sitting on their desk to get the job done; or, at least, to have their personal computers networked to sufficient resources remote from their location to accomplish the task. In the future, individuals may expect to have processing resources within reach at any time or location.

The notion of a computing environment in which computers themselves disappear into the background was raised by Mark Weiser, "The Computer for the 21st Century," *Scientific American*, September 1991. Two issues of crucial importance to transmission and display of information in such a "ubiquitous" computing environment are location and number of devices.

Weiser postulates a world in which there are many computing and computer-controlled devices surrounding each user all the time. In one example of such a system, he describes devices ranging from small computational devices called "Tabs"—inch-scale computers which are networked via wireless links—to yard-scale displays that may be used as electronic blackboards called "Board," that may cover the entire wall of a room.

Also discussed by Weiser at page 99 are "Pads," scrap-paper-like, notebook-sized computers that have no individualized identity or ownership. Weiser postulates that in the future there will be many Tabs and Pads per person, just as today there are many paper notebooks and stick-on notes per person. Consequently, users will interact with many different devices, both serially and in parallel, during the course of their daily lives.

"Guest" Tabs or Badges, and "scrap" Pads are devices not owned by any particular user. Instead, they are available—perhaps at the entrance to a building in the case of guest Badges, or in meeting rooms in the case of Tabs and Pads—for use by whoever picks them up. Picking up an Active Badge might involve checking it out from building security so that its association with a particular user can be registered with the system. A scrap Pad or Tab may also have a default use characteristic defining particular default uses of the device when not assigned to a user.

Pads and Tabs share many of the characteristics, and it will be recognized that although though the discussion that follows describes the invention primarily in terms of Tabs, either Tabs, Pads or Boards may be used to provide the features of the invention.

Tabs have been developed primarily for use as a personal information access, communication, and control device small enough to be transported at all times by its user. In the future, such Tabs should be inexpensive enough to be available in large numbers. Tabs may be installed permanently within living or working areas, and dedicated to specific purposes. Such computing devices may be dedicated to controlling specific resources, such as room lights, thermostats, or video cameras. The computing devices may be configured to have particular default interfaces for operating the specific resources.

Note that in the discussion which follows, the device itself is assumed to have sufficient power and capacity to perform the described functions directly. In actuality, it may be serving as the input/output agent of more powerful facilities with the network environment. For the purpose of this discussion, however, this distinction is unimportant.

For example, a Tab may be configured in its default state to be a light switch controller. Lighting fixture are taking on more extensive behaviors—they may be set at different intensity, or controlled from multiple locations. Behavior within so called "intelligent buildings" is even more sophisticated—lights can be programmed to turn on and off automatically at programmed times. When room sensors and other intelligence are added, the building, including the lighting system, can become truly "responsive."

A Tab device may be mounted on the wall of an office or conference room, with a communications path established to the device, or intelligent control system, that actually operates the lights. The Tab could be programmed to present a simple light control interface as its default configuration. The default controller would likely present one or more simple on-off switch buttons, one for each fixture or group of fixtures to be controlled. These buttons would be provided using standard computer user interface methods. Simulated sliders might also be provided for controlling light intensity. A Pad might present a multimedia switch controller for controlling multiple devices in the room such as lights, video, screens, etc. Default behavior would be designed to be simple and intuitive.

The inherent flexibility of such controllers is evident. In addition to basic light controls, the user interface screen may provide a "more" button which, when pushed, would provide a menu of additional capabilities. Different choices could lead to controls for the default responsive environment parameters for the room's lighting, heating, or other controllable features such as blinds, screens, or audio or video systems. This pattern of controls and expansion menus could repeat multiple times.

Users may further desire to have the characteristics of a computing device be influenced by the context surrounding it. Some actions should only take place under controlled conditions. The environment or context of a user or the device may affect operations the device is configured to perform. For example, a usually dedicated device, such as a light switch controller, may be configured under some conditions to operate as a general purpose computing device. One of the "more" choices may lead to a general purpose interface.

Some dedicated functions may require additional resources to accomplish. For instance, for a Pad or Board a specialized dedicated use could be an electronic meeting calendar, constantly displaying and providing interactive access to the events scheduled to take place in the room to which the device is attached. Clearly, such a device could also contain the mechanisms to permit its generalization to a more flexible computing device.

When a user goes to a meeting in another room, the user may choose to temporarily use otherwise occupied devices, such as a default light switch, which may become a generic Tab with general purpose interface characteristics when removed from its location on a wall or commanded by the user. The device thus becomes a general purpose personal device, providing functions unrelated to its default use.

One aspect of the present invention is the ability to provide a system in which a device dedicated to a particular specialized function, such as a resource controller or room calendar application, may be easily configured to provide general usage characteristics.

In another aspect of the invention, the usage interface characteristics of a device may be determined according to the immediate environment of the device, for example depending upon whether it is tethered to a dock. Further, the system may determine interface characteristics to be a manually assigned default state depending upon the context and users in proximity to the device.

SUMMARY OF THE INVENTION

The present invention describes a method for superimposing general usage interface characteristics upon a particular computing device configured with specialized interface characteristics to enable the particular computing device to control general purpose computing functions. The computing system may include multiple computing devices, users, and subsystems that may be controlled by control devices. A first event signals a request for a change of said particular computing device from specialized interface characteristics to general interface characteristics, and the particular computing device is reconfigured to general interface characteristics unrelated to the specialized interface.

In another configuration, a method is described for establishing control by a user of at least a portion of the display of a particular computing device configured for specialized interface characteristics for general purpose use by a user based on the context of the system and the environment of the particular device. A first event requesting control of said particular device is generated, device properties of the particular device are identified, and the present state and contextual attributes of the particular device is determined. The method includes determining interface characteristics of the particular device to be granted to the identified user based on the first event, the device properties, and the present state and context of the particular device. The interface characteristics are then provided to the particular device.

The following description, the drawings and the claims further set forth these and other objects, features and advantages of the invention.

DETAILED DESCRIPTION

Figure 1:
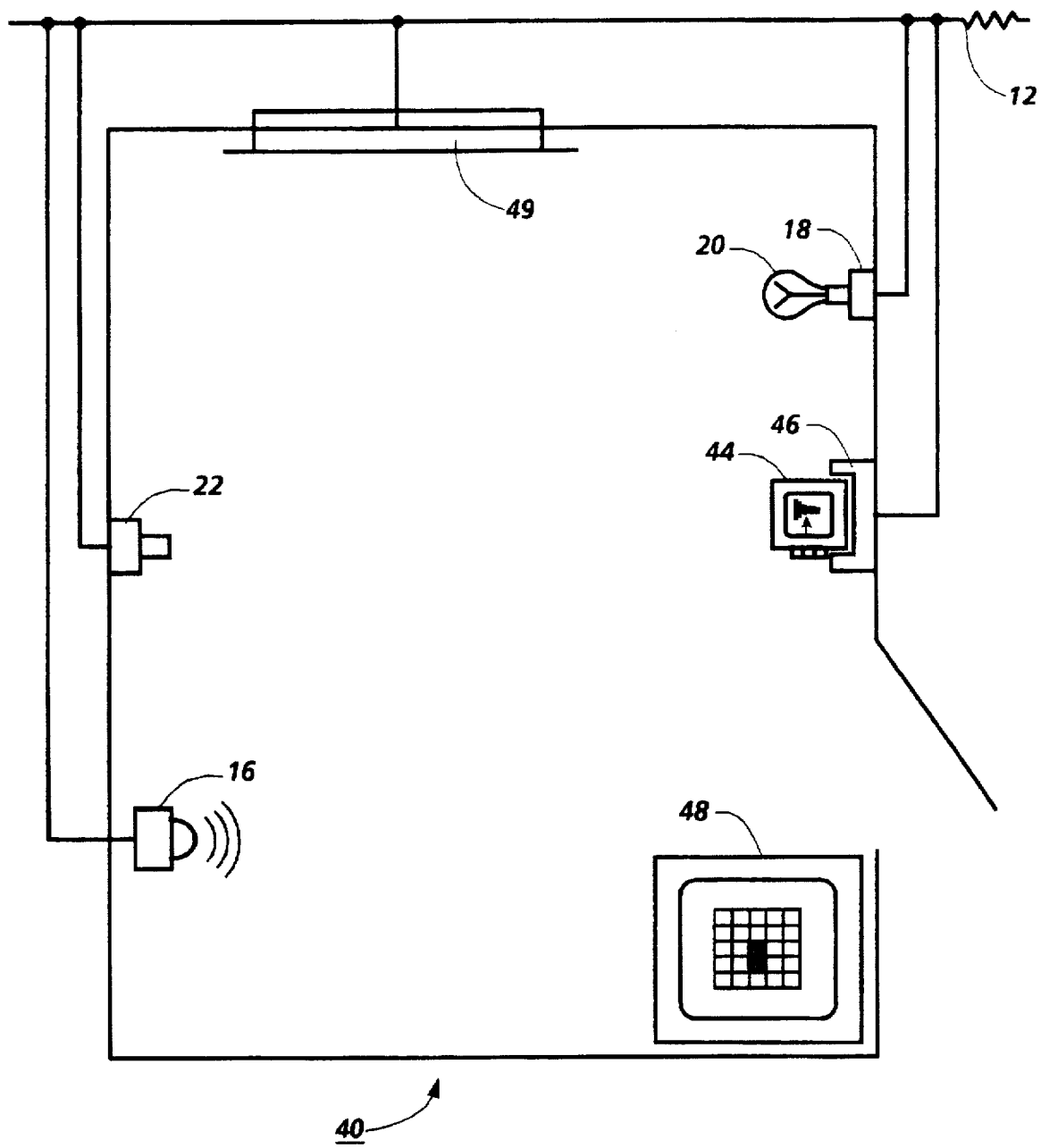
FIGS. 1 and 2 show an office environment configured to support a "ubiquitous computing" system, with a computing device configured with controller and general interface characteristics, respectively.
Figure 2:
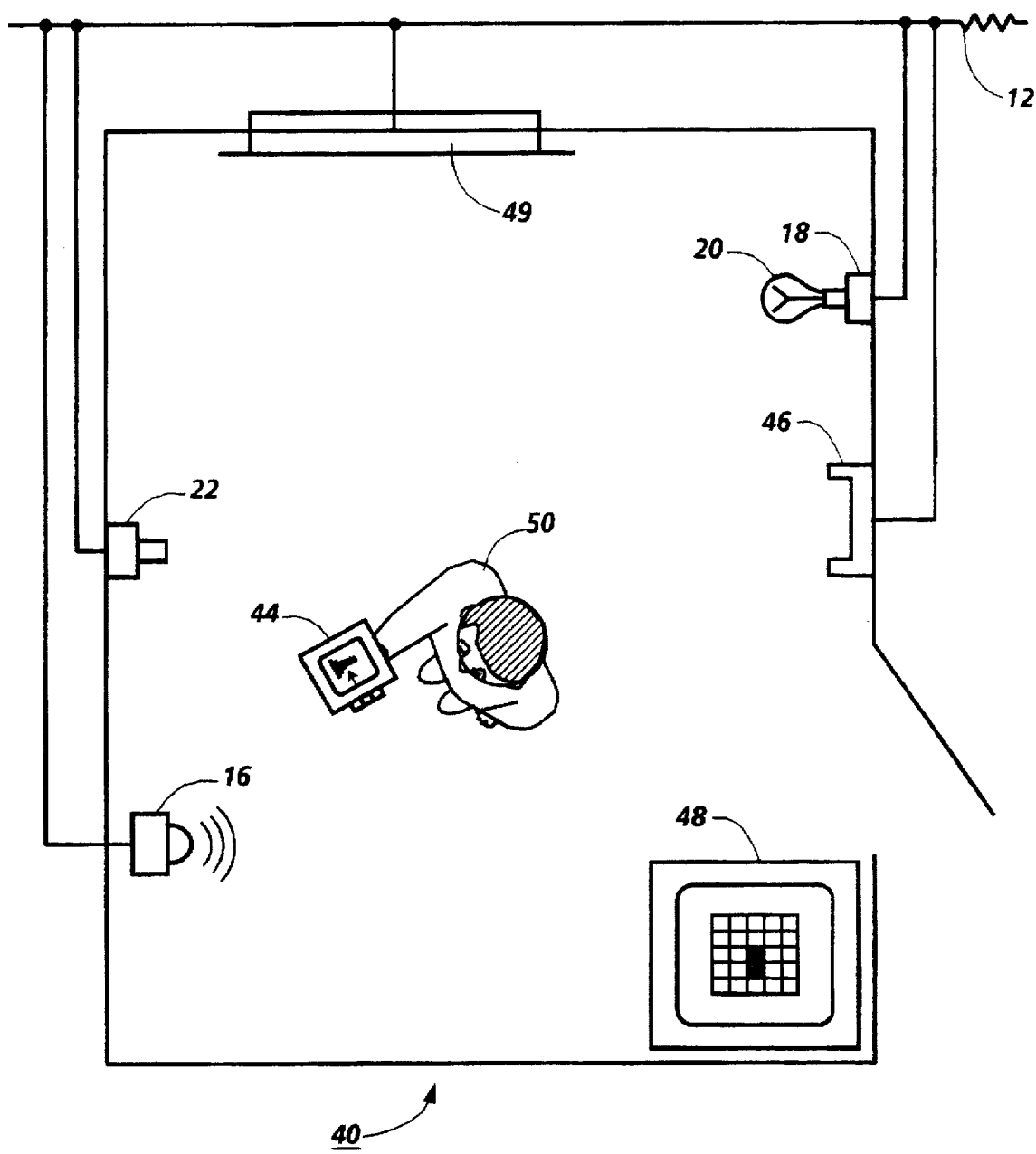

FIGS. 1 and 2 illustrate the general principal of the present invention. FIG. 1 shows an office environment 40 configured to support a "ubiquitous computing" system. Components that might be found in such a system comprise hardwired network backbone 12, radio or infrared transceiver 16, a Tab configured as a resource controller 44, with a network connection supplied by dock 46. Tab 44 might be alternatively be provided a wireless connection to network 12, with device location sensor 22 providing information regarding its physical location. Pad 48 is configured as an information display, with a wireless connection to network 12 through transceiver 16.

Although there may be several ways to support a ubiquitous computing environment to accommodate the entire range of mobility required for ubiquitous computers, a preferred implementation is a network that allows "wireless" communication with mobile devices. To date, many "wireless" networks have already been designed—the most notable, perhaps, being the cellular telephone network. Wireless network systems are generally concerned with the physical layer of the network, and more specifically, with methods of transferring the communication support for a mobile unit from one base station to another. These issues may be classified as problems in "communication continuity." Communication continuity is concerned primarily with mechanisms for providing a continuous pathway for data between two or more units, at least one such unit being mobile, and for reestablishing a data pathway in the event of an unwanted disruption. By contrast, "processing continuity" relates to maintaining a current and proper processing context between two units.

A system for maintaining communication and processing continuity in a wireless system between a mobile processing unit and remotely resident applications is described in coassigned, copending patent application Ser. NO. 08/100,655, entitled A METHOD AND SYSTEM FOR MAINTAINING PROCESSING CONTINUITY TO MOBILE COMPUTERS IN A WIRELESS NETWORK, filed Aug. 30, 1993 by Want et al, now U.S. Pat. No. 5,564,070. The system includes a network backbone, at least one stationary processor coupled to the backbone, and at least one transceiver coupled to the backbone. The transceivers are configured to communicate with the mobile unit through a wireless medium. Mobile units intermittently communicate with applications, and may provide information to the system which may detect when the mobile unit has been moved.

Network backbone 12 provides high bandwidth communications between the various communication and computing devices. In the present embodiment, a 10 Mbps Ethernet provides the basic infrastructure. It will be appreciated that essentially any network architecture may suffice for the backbone, as long as the bandwidth is sufficient to provide suitable performance to support a desired maximum number of devices.

Mobile communication and computer units connect to backbone 12 via transceiver 16. Although only radio and infrared transmission are employed for wireless communication in the presently preferred embodiment, it will be appreciated that other types of electromagnetic and acoustic transmission might be suitable. Additionally, it will be appreciated that multiple frequencies may be employed to partition the communication space into noninterfering cells. Depending on the implementation, more than one transceiver 16 or device location sensor 22 may be needed to precisely locate infrared devices in the office.

Transceiver 16 and device location sensor 22 in the described embodiment may be connected to network 12 through a base station or gateway computer (not shown), or through available workstations in the room (not shown), which performs translation between the wireless communication from the transceiver and the communication packets sent over the network 12.

Transceivers and location sensors may, for the present invention, consist of one or more physical devices.

Tab 44 is a mobile unit that may connect with the network through the wireless media or through a wired connection via dock 46. Tab 44 is a small stylus-based mobile computer. A Tab, in a general purpose configuration, may be carried by a user throughout the workplace, may be assigned to a particular user, and further may identify that user to sensing devices. Functionally, a Tab may be a simple device. Speed and memory capacity requirements are very modest, thus enabling these devices to be very small and consume little power. As a result, Tabs can be very portable. Clearly, other devices, including other mobile devices, with at least the ability to perform simple communications with the system and to interact with the user and display messages may be used to perform the techniques herein described, as well. Pads, for example, may be used and, being more powerful, may further provide additional applications capabilities to the user.

Each device displays "interface characteristics" which determine the state of the device. For example, a Tab which is assigned to a particular user 50 may have "general characteristics" for its user interface which allow the Tab to perform as a general purpose computing device. Alternately, Tab 44 in FIG. 1 may be assigned a particular task of controlling another resource, or may provide some other dedicated function related to its location or other criteria, such as an information kiosk, or location finder application, for example. A Tab configured to be a resource controller may be said to have "controller characteristics."

Resource controllers may control various other devices in the room they operate in. The network facility, whether wired or wireless, can be employed in conventional ways to communicate control information to other computing resources, directly connected to the controlled devices, which carry out the requested actions (turn on or off the light, for example). For example, Tab 44 is configured as a resource controller to control the light 20 in room 40 via control computational hardware 18. Similarly, the network can be used in conventional ways to connect an information display such as a calendar to the database that provides a persistent representation of its contents.

A "user," for the purposes of the discussion below, is a human who interacts, implicitly or explicitly, with the resources of the system. A "device" is any other entity with the ability to computationally interact with the system, that is, to accept and respond to computational commands. A device may include a computer workstation, a small portable computing device, or a device controller as described above. Each device must present consistent characterizing information about itself in a format that is computationally recognizable to any potential client of that device.

As an example of the technique of the present invention, in the description herein the system will be described in terms of a Tab device which, in its default controller state, is used to control a light source. Clearly the system of the present invention may be applied to other uses, such as controlling other types of devices and equipment, as well.

In FIG. 2, a user 50 enters office 40, and obtains device 44 from its controller location of dock 46. User 50 may select an override button, whereupon the display of device 44 is changed to generic characteristics 48, enabling the use of controller device 44 as a general purpose computing device, having all the properties of general purpose computing devices described in previously referenced Ser. No. 08/161, 968, now U.S. Pat. No. 5,555,376. Alternatively, in some applications the system itself may note a change in position for device 44 from the controller position and change to general interface characteristics. The change may be sensed by transceiver 16, or by removal from a wired connection station, or "dock." Detecting communication with another transceiver or a change from a "docked" connection to wireless communication may also signal a change in position. Some other kind of proximity detector may also be used.

In this general purpose interface mode, user 50 may use device 44 to read mail, look up phone numbers, search databases for needed information, or communicate with other users or devices, and so on. Tab resource controller 44 has now become a general purpose personal device, providing all the capabilities of any other general purpose device in the system. Alternatively, user 50 might have chosen Pad 48 or Board 49 instead of, or in addition to, Tab 44.

When user 50 has finished using device 44 as a general purpose device, user 50 may replace controller device 44 at its controller location. The system may return the resource controller characteristics 46 to the display by any number of techniques, for example by a manual request by the user, by a simple timeout function triggered by the absence of any input for a relatively brief interval, by a simple docking switch, or by the docking of the device for purposes of supplying power or wired communications.

Occasionally, the user may neglect to return the device to a mounted controller location or dock, or may even remove it from the room, leaving the room without a light switch. In such an instance, a second computing device may be placed in the dock and may be configured with the control characteristics for devices controlled from that location. The system may further be configured to alert an administrator when a resource controller device is missing, so that another device may be obtained and placed at the controller location.

The flowcharts which follow describe the system operations according to the steps that may be performed by a number of devices distributed throughout the system, and do not necessarily represent steps performed by any one machine or device unless so specified.

Figure 3:
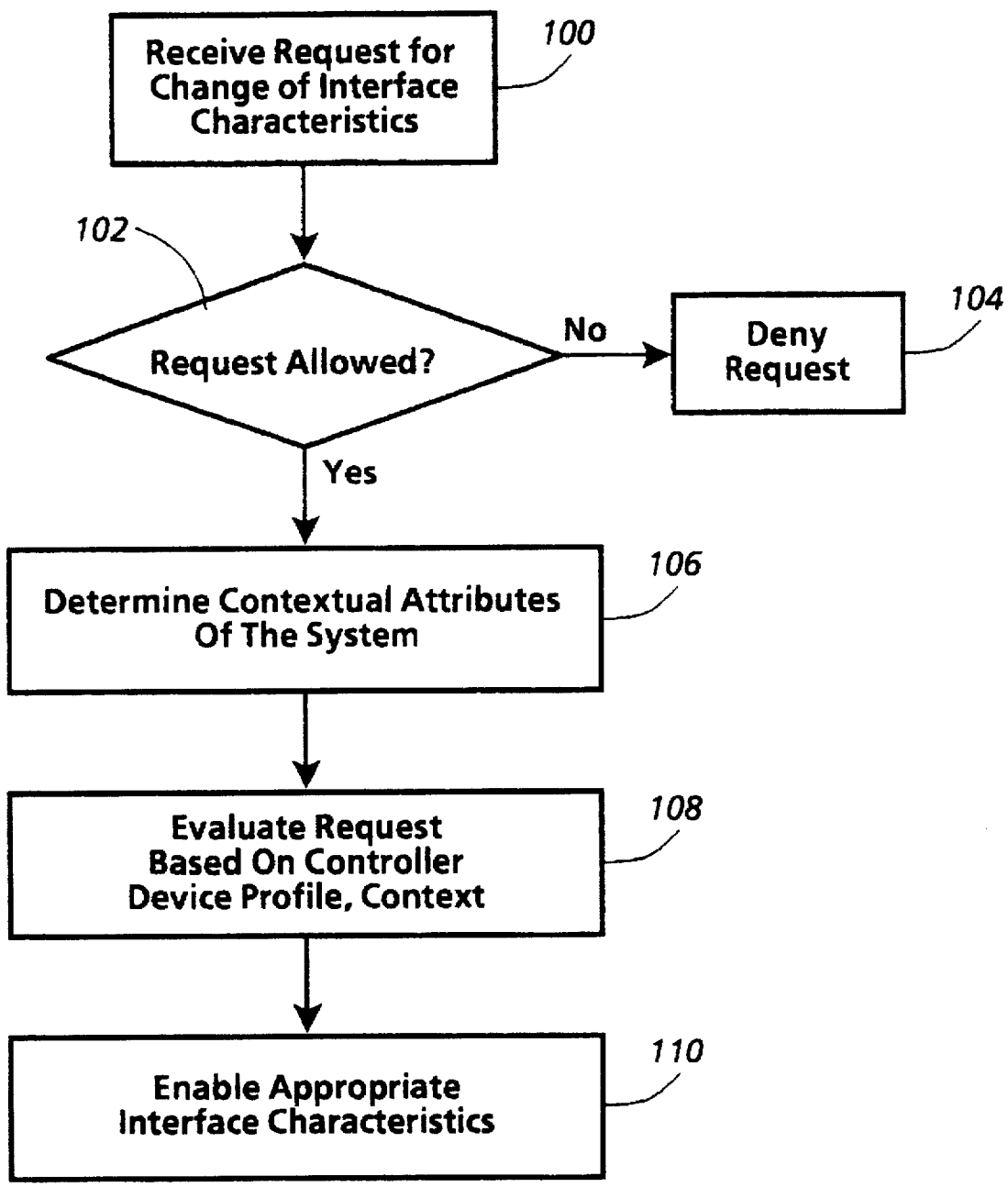
FIG. 3 describes changing the interface characteristics for a particular device based on context of the device.

FIG. 3 describes the change of characteristics of a particular device based on context including environment and proximity. This includes changing resource control device controller characteristics to general characteristics, or changing a general purpose device into a resource controller by enabling controller characteristics. The interface characteristics of a device may comprise exclusive or partial control of the computing resources of the device.

For example, on a small device, such as a Tab, the interface characteristics may be by default exclusive, since the Tab may not have the capabilities to perform more than a single operation at a time. A large device, such as an electronic "Board" that may cover an entire wall, however, usually has the capability to display numerous windows and applications, and may only allocate a portion of its resources to any interface characteristics. Each device may have a profile which describes its capabilities and default interface characteristics to the system.

Other devices, such as those providing shared information tailored to the profiles of users in close proximity to the device, may mediate between controller characteristics and the needs and desires of a number of users at one time. For example, the device may only be available for general purpose use when only one user is in proximity, or when no other operations controlled by the device are in progress. Devices may restrict changes in characteristics to certain times or particular users.

In step 100, the device receives a request for a change of interface characteristics. Such a request may come explicitly from a user, by selecting a button for example. A request may also be made automatically by the system if it senses a change in position or physical configuration, if the device is so configured.

Step 102 checks the current status of the device. If, for some reason, the request is not allowed—if the device is currently occupied in a control operation or is currently in use by another user, for example—step 104 denies the change in interface characteristics.

Step 106 determines the context of the device, and step 108 then evaluates the request for change in the interface characteristics based on the context, the device properties, and perhaps the user's identity. Step 110 then enables the appropriate interface characteristics. These rights may be all or a subset of the rights initially requested, depending upon the evaluation. For example, a user picking up a light controller Tab may be given full access rights to the system and memory of the device. A Pad or Board, however, may allow some users full access, and other users access only to certain subsystems, perhaps continuing specialized characteristics on a portion of the interface. For example, when a Board is in use as an information kiosk, it may dedicate only a portion of its display to any particular user, and continue its specialized information providing operations on the rest.

The user may, in some instances, be required to provide authentication and login information to the generic interface before performing some operations. If the owner is not authenticated, the generic characteristics of the device may allow the user to access public data available through the appropriate distributed network. If a device is able to identify and authenticate the user, automatic login procedures may be initiated by the system, depending on the device profile and the ownership request. The user requesting use of part of the device may specify to the system preferred customization properties for the device, which are brought about upon login. For example, the user may desire a mail window to be retrieved automatically and displayed upon login to a device, such as a Pad, or an entire electronic desktop be retrieved for display on a workstation. Devices may be automatically customized to match the personal preferences of the computing environment of an authenticated user known to the system.

Figure 4:
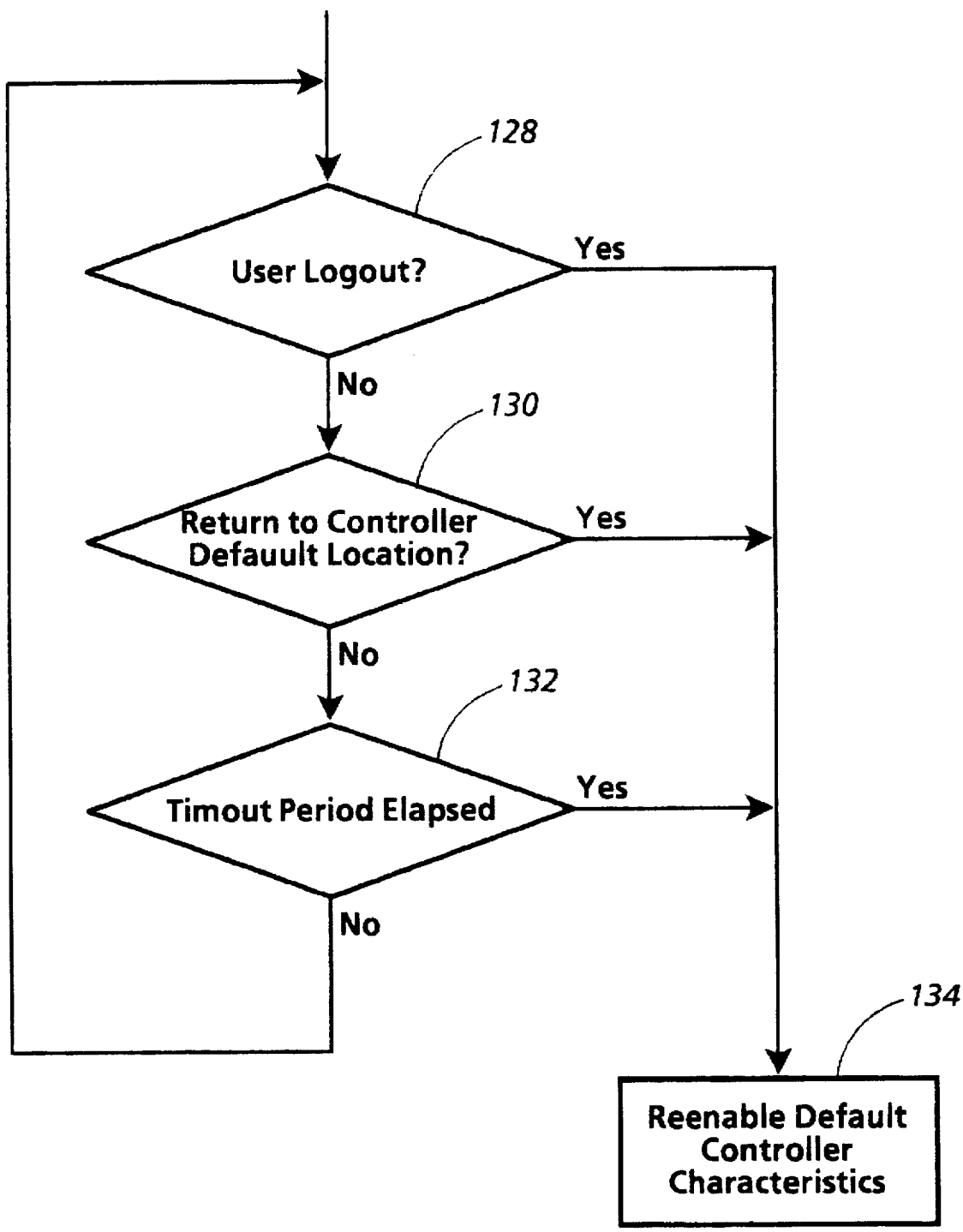
FIG. 4 describes procedures for returning to default interface characteristics.

As shown in FIG. 4, a resource controller device that has been temporarily used as a general purpose device may return to its default resource controller characteristics in a number of ways. The user may explicitly specify a logout procedure in step 128.

Automatic logout of the user is depicted in step 130. When the user is out of the prescribed proximity of the device, or the device is returned to its original location, or, in the case of a tethered device, a physical connection is reestablished, logout may be initiated and the device returned to default controller interface characteristics.

Another means of automatic return to resource controller characteristics is depicted in step 132. When the user has not entered an input during some prescribed time interval, logout is initiated and the device is returned to a default controller state.

Which of the above-described automatic logout techniques is enabled, if any, depends on the device profile and perhaps on the parameters specified as part of the user's change request procedure.

There a number of architecture models that may be used to implement the techniques of the invention. A simple implementation requires only that the device contain one or more processors and memory sufficient to carry out all the functions to be asked of it. It must be able to communicate over general purpose networks, either wired or wireless.

When supplied with power, such a device would either run a default program supplied in an onboard ROM, or go through an initialization procedure which would download the dedicated processing program from a network repository, using commonly understood methods. A continuously-running monitor process would periodically check for the various changes in state (undocking, location change, change of base station). In addition, the dedicated application would be programmed to respond to a user request for the more general functions, as described in relation to FIG. 3. The transition would be implemented simply by using network file transmission methods to load a new, more general program, in to the device's memory and then transferring control to the new program.

Similarly, any general application running on the machine would be required to run a monitoring process (or perhaps the operating system of the machine could provide it regardless of the application) which would detect logout, redocking to power and wired communication, or the device's detected reappearance at its assigned default location. This would trigger a termination of the more general application, and (a reload and) restart of the dedicated application.

Using this model, any special configuration of the device could be built into its ROM or obtained by the initialization code, based on a device identifier, as part of the initial dedicated application download process. This model requires storage repositories, name and location services, authentication services, and the like.

A more complex architecture for implementing the techniques of the invention is shown in FIGS. 5 to 8, which relate to a ubiquitous computing system architecture that may also be used to implement the system of the present invention if the Tab, Pad, or other device has insufficient processing power, memory, etc., to implement the dedicated and general user applications. Clearly, there are other systems which may be used to implement the present invention, as well. More detail concerning the architecture shown and described in the following figures may be found in Ser. No. 08/161,968, previously referenced and incorporated, now U.S. Pat. No. 5,555,376.

Figure 5:
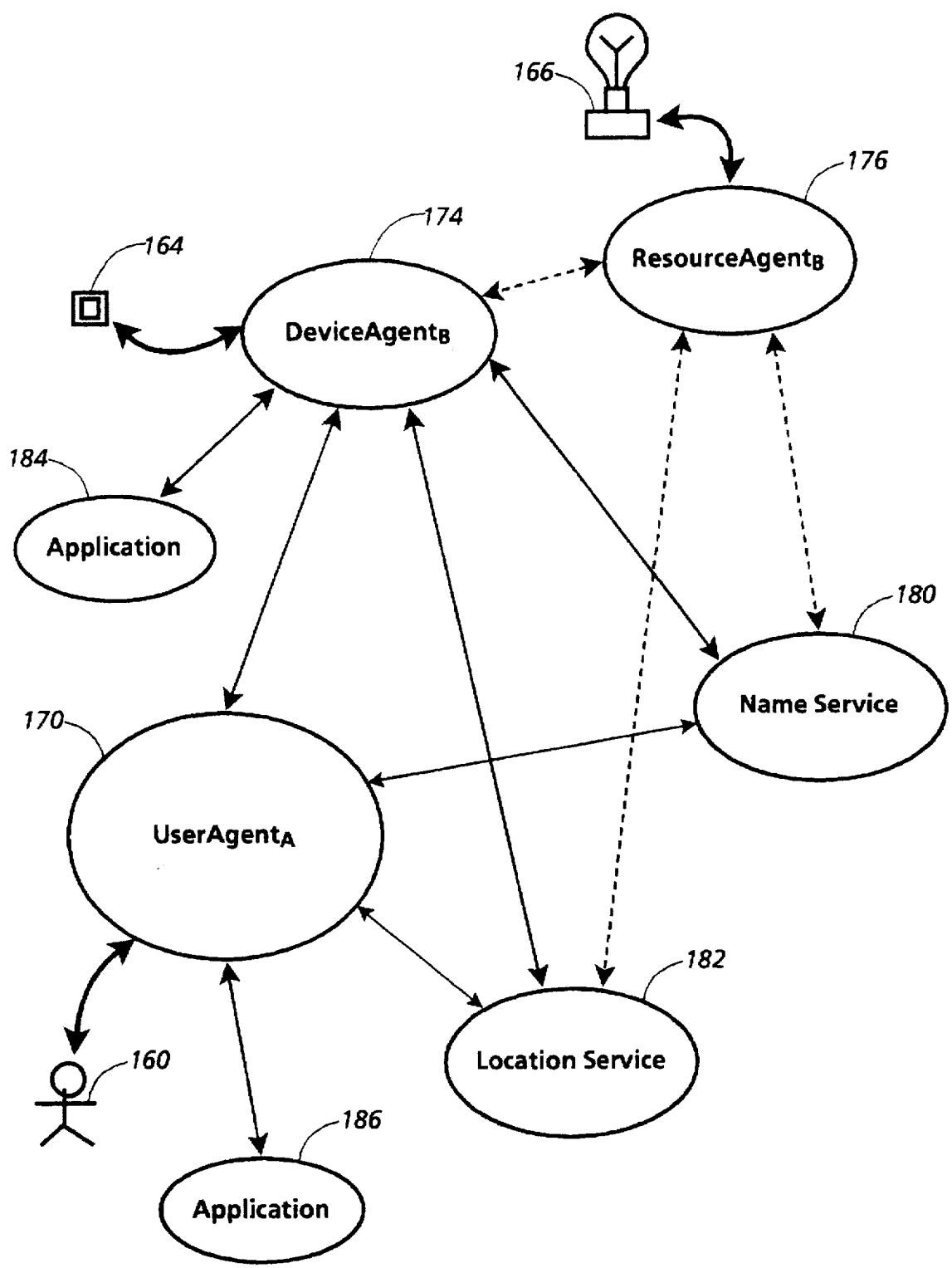
FIG. 5 shows a high level diagram of the system architecture of the system elements and communications paths between the system, users and devices used to determine the context of the system.

FIG. 5 shows a high level diagram of a system architecture, including system elements and communications paths between the system, users and devices. Note that FIG. 5 is meant to be illustrative of the capabilities of the system shown, and not all possible communications paths are shown among the processes shown in the figure.

The present system as described employs a distributed file system to store persistent data of the system. Clearly other means of storing persistent data may also be available in the system. However each agent, described below, must employ some file system for storing persistent data that is available to at least that agent.

Name Service 180 provides a place where processes can register themselves to be found by other interested parties, based on knowledge of a particular name or of particular attribute information. All objects, either users or devices, that wish to be identifiable by name register themselves in Name Service 180.

Each physical object-users, devices, or groups of devices (such as the input and output devices that comprise a computer terminal)—is represented in the system by a unique "agent." Agents may consist of several modules, some of which perform system infrastructure functions, and some of which are responsible for implementing the agent's responsibilities for specific applications or performing specific operations. For example, each user is represented in the system by a unique "UserAgent." A user's agent is under control of the user, and interacts with the rest of the system as an electronic proxy for that user. Personal information about a user is primarily collected by, and primarily resides in, the user's agent. This information may include: 1) relatively static information, such as preferences and policies, 2) modestly dynamic information, such as personal calendar or datebook information, and 3) very dynamic information, such as current location and activity. A user's agent controls access to the user's personal information, as prescribed by the personal preferences and policies known to that agent, and as appropriate to the current circumstances as known by that agent. Other system elements have only such access as is granted by the user's agent.

Agents may make up for a lack of computing power in a device. The purpose of a DeviceAgent, for example, is to implement the actual functionality of the device itself. A physical Tab may be capable only of display update commands coming from its DeviceAgent and transmitting user actions to its DeviceAgent for appropriate transmittal through the system.

Some devices are stationary objects that simply receive information and do not otherwise interact with the objects around it. Other devices may collect or send information, provide services, or in other ways interact with users and devices in the system. Each electronic device or group of devices that interacts with the "world" is represented in the system by a unique "DeviceAgent." The Device agent must also be able to carry out specific dedicated functions, as commanded by a user, without identifying the user or requiring the intervention of a user agent, for applications such as controlling a lights switch. That agent collects and manages information about, and exercises direct control over, the device. Other system elements do not interact directly with the device, but indirectly through the device's agent. Information that the agent may manage and collect includes things like the capabilities of the device (e.g., if it has a display, and whether or not that display is color), the current state of the device, and possibly the ownership state of the device (i.e., who may request operations on it).

In FIG. 5, computing device 164, which may be a Tab or Pad, is represented by an agent DeviceAgent$_B$ 174. Light source 166 may be controlled by a resource control agent 176. An object's "characterizing information," how it is described to the system, is maintained and controlled by that object's agent.

User 160 is represented in the system to other agents by UserAgent$_A$ 170. Applications 184 and 186 may be associated with DeviceAgents or UserAgents. Applications communicate through agents with various parts of the system to accomplish a variety of tasks, for example to run the calendar program associated with Pad 48 or the light control program associated with Tab 44.

When an application or agent needs to determine coincidence of people or devices at or near a particular location, it may use a Location Service 182. Location-specific information about users and devices is registered in the Location Service 182 by the relevant agents.

Requests to register or update the location of objects with the Location Service are made by their managing agents. Public objects whose identities and locations are not meant to be kept secret—such as printers and office display terminals—may register a full description in the Location Service. Private objects—such as a User Agent—register customized descriptions of themselves that reveal only what they wish to make publicly available. Registrations include a handle that can be used to contact the agent representing the located object for further information or interaction for customized registrations. The agent can then choose to answer further queries based on the access control policies of that agent.

Figure 6:
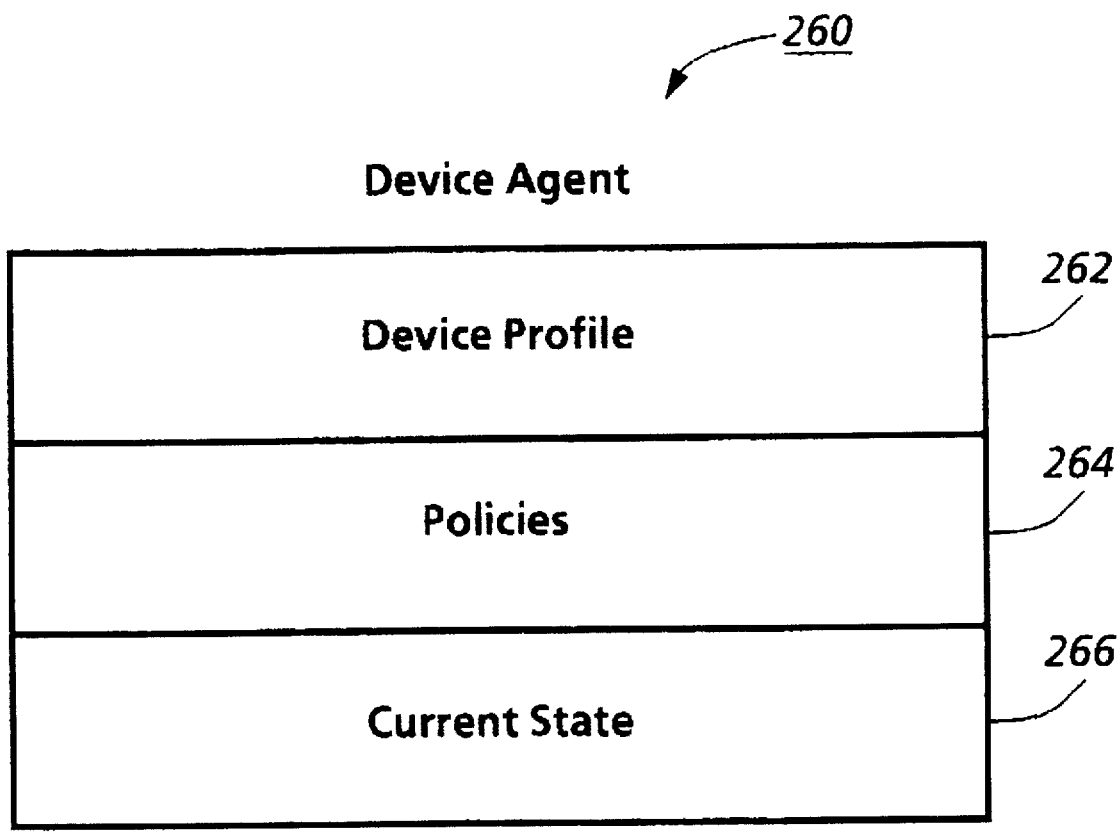
FIG. 6 shows general aspects of a DeviceAgent.
Figure 7:
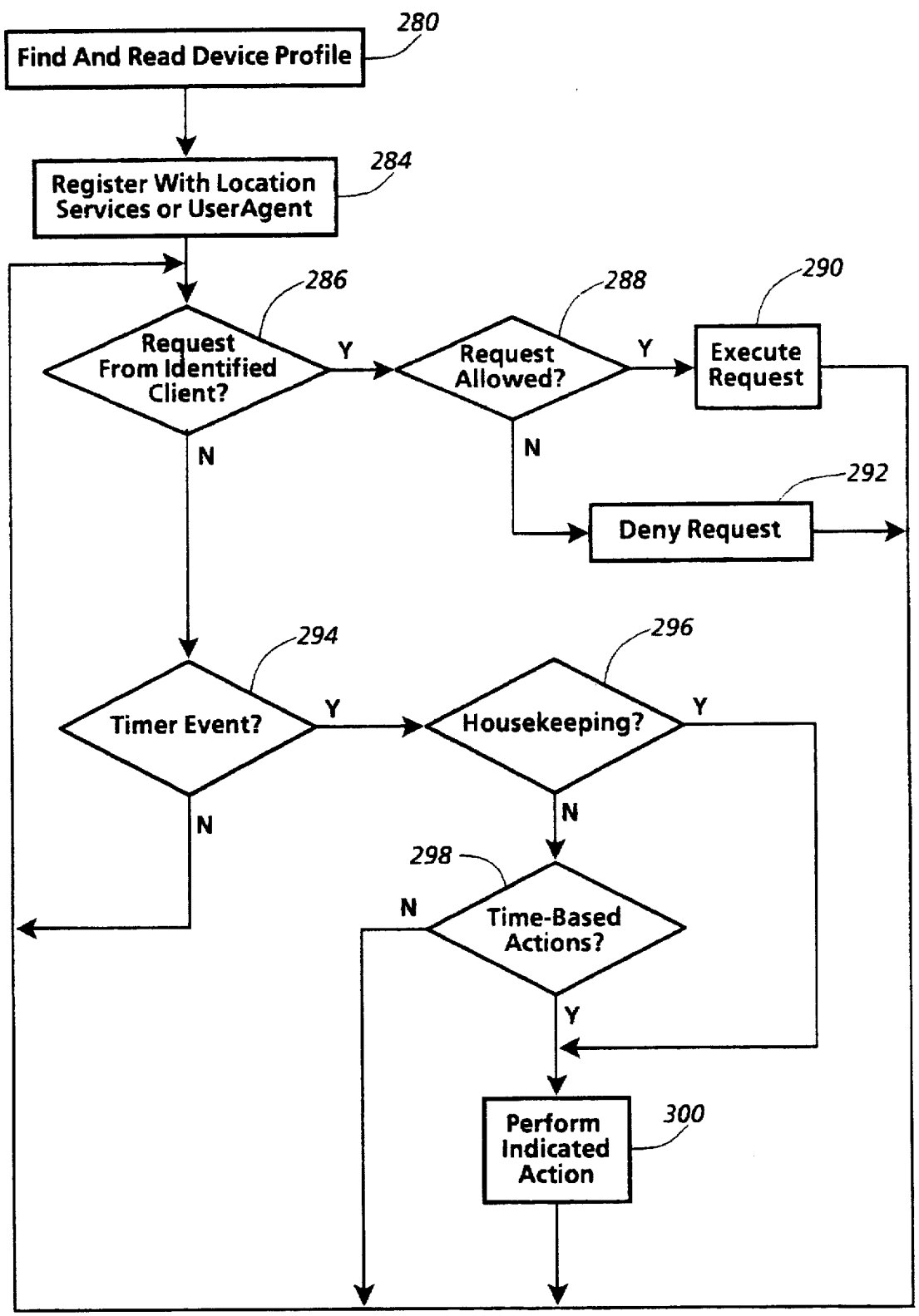
FIG. 7 describes the operation of a DeviceAgent.

FIGS. 6 and 7 describe aspects of the DeviceAgent 260. The DeviceAgent process is an event-driven process, and may consist of several modules, some of which perform system infrastructure functions, and some of which are responsible for implementing the agent's responsibilities for specific applications. Devices may not need to keep track of the state in other services, hence would only need to respond to two different kinds of events—RPC requests from clients, and Timer alarm signals.

In the system example described herein, a Device Agent may control the resource controller device, and a separate Agent may control the mechanism of the lights, so that the two agents must communicate to control the lights.

As shown in FIG. 6, DeviceAgent 260 includes a device profile 262 which describes relevant information about that particular device, policies 264 which may also describe allowable operations for the device, and the current state 266 of the device. The profile 262, policies 264, or current state 266 may, for example, describe the ownership or capabilities of the device. Ownership may comprise exclusive or shared computational control of a device. Policies 264 may also describe temporarily set policies, set by the user with at least partial ownership of the device or describe dedicated actions, like light switch control, that don't require interventions of an owner. Tabs or Pads or other computing devices may be controlled by DeviceAgents. Other kinds of devices that might be controlled by DeviceAgents include printers and copiers.

FIG. 7 describes the general operation of a DeviceAgent. The device's profile information is read in step 280. The device profile file may be read from a specified file known to the DeviceAgent. The profile may further specify default interface characteristics that the device will have. For example, the device profile may specify that the device is a resource controller and should be configured as such, and the resource which it controls.

The physical location of the device may be registered in step 284 with a Location Service (if it is a publicly available device) describing locations of devices in the system. This allows relevant parties to find the device by location.

In step 286, clients making requests to the DeviceAgent are identified, and the device's policy database (and current state) is then used to decide in step 288 whether or not to perform any given client request. For example, a user may request that the device become a general purpose device rather than a light controller.

Device default policy information allows a device to decide which client RPC requests to honor in step 290 and which to deny in step 292. It can also determine which of several "behaviors" the device should exhibit under various circumstances. For example, under some control conditions, the device may not allow a user to use it for general purpose operations.

If a controller device can be owned by a user (some devices' profiles may state that they cannot be owned by anyone), then the owner's UserAgent may specify policies and control operations of the DeviceAgent. The device's policy information may revert to default values when ownership of the device is relinquished. Whether or not that happens can itself be something that is determined by the device's policy information.

Some possible examples of client requests to a DeviceAgent for a default controller are:

a) Claim ownership.

The DeviceAgent may only honor client requests from a specified owner once this request is granted, or may give control of the device over to the UserAgent of the owner.

b) Relinquish ownership.

The DeviceAgent will accept requests from anyone once this request has been processed.

c) Query capabilities and state.

If granted, the DeviceAgent will return a record containing information about its capabilities (e.g., {1000×1200 pixel display, 256 colors, video-capable}) and its current state (e.g., {on, owned, video connection currently established}).

d) Set state.

If granted (i.e., authorized and a correct operation is being requested), the DeviceAgent will set its state as requested (e.g., set state so that all future X windows displayed have a red title bar)

Step 294 responds to timer events. Timer events may include housekeeping duties as shown in step 296, or time-based action as shown in step 298. The indicated action is performed in step 300.

Figure 8:
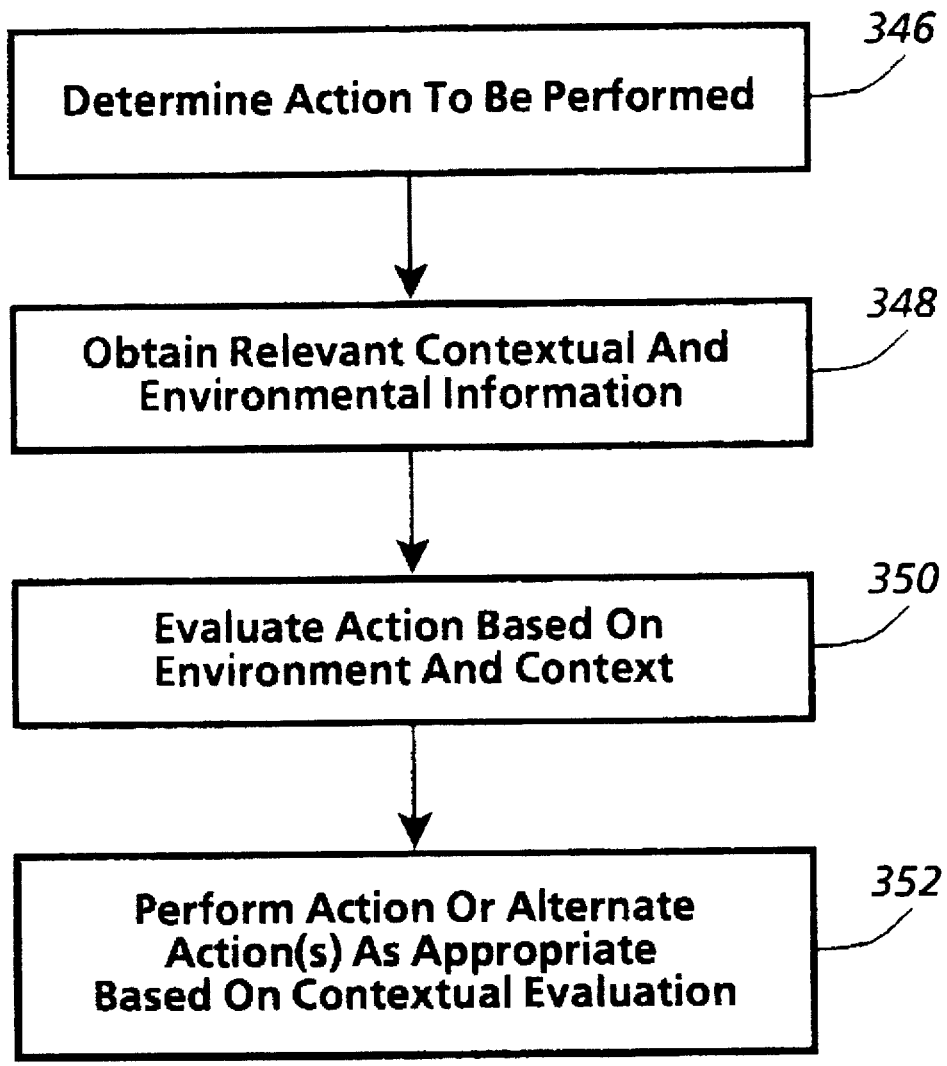
FIG. 8 describes in general terms the retrieval and use of contextual information in decision-making.

FIG. 8 describes in general terms the use of context information in decision-making. Some steps may be performed by different processes; for example, an application may hand a task off to a UserAgent or DeviceAgent at some point, in which case some of the decision-making is done by the application process and some by the agent process.

Step 346 determines the action to be performed. This may be based on a request from another application or agent, or may be triggered by a change in state or context of the system. Step 348 obtains contextual information, i.e., information relevant to the action, from the appropriate sources as described in previously referenced Ser. No. 08/161,968, now U.S. Pat. No. 5,555,376.

Step 350 evaluates the action to be performed based on the contextual and environmental information obtained in box 348. This evaluation may include determining if an action is allowed under present context, or is appropriate for the situation.

Step 352 performs appropriate actions based on the evaluation of step 350. Depending upon the context, this may include performing the originally requested action, modifying the action or performing a different action, or denying or delaying the action.

Returning briefly to FIGS. 3 and 4, it may be seen how the architecture described above may be used to implement the present invention.

In step 500, the Device Agent receives a request for a change of interface characteristics. Such a request may be made, for example, based on a change in the device's precise location, or explicitly by changing physical or logical buttons on the device itself. Step 502 checks the current status of the device, as maintained by the Device Agent. If, for some reason, the request is not allowed—if the device is currently occupied in a control operation or is currently in use by another user, for example—step 504 denies the change in interface characteristics.

In step 506, the Device Agent determines the context of the device, and step 508 then evaluates the request for change in the interface characteristics based on the context of the device and perhaps the user's identity. Step 510 then enables the appropriate interface characteristics. These rights may be all or a subset of the rights initially requested, depending on the evaluation. For example, a user picking up a light controller Tab may be given full access rights to the system and memory of the device. A Board, however, may allow some users full access, and other users access only to certain subsystems, perhaps continuing controller characteristics on a portion of the Board interface.

As shown in FIG. 4 and described above, a resource controller device that has been temporarily used as a general purpose device may return to its default resource controller characteristics in a number of ways.

Automatic logout of the user is depicted in step 530. When the user is out of the prescribed proximity of the device, logout is initiated and the device is returned to a default controller state.

Which of the above-described automatic logout techniques is enabled, if any, may depend upon the device profile and perhaps on the parameters specified as part of the user's change request procedure.

If lighting and other controllable aspects of the environment are provided through default specialization of Tabs or other devices, any such device should be able to specialize to these uses. This a user would not have to relocate to a light switch in order to control it, but might merely use their own personal Tab or Pad to proceed (through a difference menu sequence, since the device would not by default be so configured) to the appropriate control panel and effect the action. Furthermore, through familiarity with the control panels for various specialized devices, the user would understand how to use the control panel without additional training.

Although the invention has been described in relation to various implementations, together with modifications, variations and extensions thereof, other implementations, modifications, variations and extensions are within the scope of the invention. The invention is therefore not limited by the description contained herein or by the drawings, but only by the claims.

What is claimed:

1. A method for superimposing general usage interface characteristics upon a particular computing device in a computing system, the computing system including multiple computing devices, users, and subsystems that may be controlled by control devices, wherein the particular computing device is configured with specialized interface characteristics enabling control of a one of the subsystems, the method comprising:

receiving a first event signaling a request for a change of said particular computing device from specialized interface characteristics to general interface characteristics for performing general purpose computing functions unrelated to controlling the one of the subsystems; and reconfiguring said particular computing device to the general interface characteristics.

2. The method of claim 1, wherein said first event results from an signal made by a user of the users.

3. The method of claim 1, wherein said first event results from a change in a physical position of the particular computing device.

4. The method of claim 1, wherein said first event is made automatically by the computing system based on contextual attributes of the particular computing device.

5. The method of claim 1, further comprising:

receiving a second event requesting a change of said particular computing device from the general interface characteristics to the specialized interface characteristics;

reconfiguring said particular computing device to the specialized interface characteristics.

6. The method of claim 5, wherein said second event results from an action made by a user of the users.

7. The method of claim 5, wherein said second event results from a change in a physical position of the particular computing device.

8. The method of claim 5, wherein said second event is made automatically by the computing system based on contextual attributes of the particular computing device.

9. The method of claim 1, wherein said particular computing device is a mobile computing device.

10. In a system of mobile and fixed devices, controllable subsystems, and mobile users, each device and mobile user being identifiable by the system, a method for establishing control by a mobile user of at least a portion of a display of a particular device configured for specialized interface characteristics for general purpose use by a first mobile user based on a context of the system and the environment of the particular device, the method comprising:

generating a first event requesting control of said particular device;

identifying device properties of said particular device;

determining a present state of said particular device;

determining contextual attributes of said particular device, including mobile users and devices in proximity to said particular device;

determining interface characteristics of said particular device to be granted to said first mobile user based on said first event, said device properties of said particular device, said present state of said particular device, and said context of said particular device; and providing said interface characteristics to said particular device.

11. The method of claim 10, wherein said particular device is configured with specialized interface characteristics for controlling at least one controllable subsystem.

12. The method of claim 11, further comprising determining a present state of said controllable subsystem, and further determining interface characteristics of said particular device to be granted to said first mobile user based on said present state of said controllable subsystem.

13. A method for creating a specialized interface device for controlling a controllable subsystem from any one of a multiplicity of general purpose computing devices based on a context of the one general purpose computing device in a system of mobile and fixed devices, controllable subsystems, and mobile users, each general purpose computing device and user being identifiable by the system, each general purpose computer device having a general purpose interface for performing general purpose computing functions the method comprising:

determining contextual attributes of the controllable subsystem;

selecting the one general purpose computing device from the general purpose devices capable of providing specialized interface characteristics for said controllable subsystem;

generating an event requesting specialized control of said one general purpose computing device; and providing said specialized interface characteristics to said one general purpose computing device in response to said event.

14. The method of claim 13, wherein selecting the one general purpose device capable of providing specialized interface characteristics for said controllable subsystem further comprises:

identifying general purpose computing devices with contextual attributes indicating ability to provide specialized interface characteristics for said controllable subsystem;

identifying device properties of at least one of said general purpose computing devices;

determining a present state of said at least one of said general purpose computing devices;

determining for said at least one of said general purpose computing devices, users and devices in proximity to said at least one general purpose computing devices; and selecting the one of the general purpose computing devices based upon said device properties, present state and contextual attributes.

* * * * *